United States Patent [19]

Grube et al.

[11] Patent Number: 5,570,100
[45] Date of Patent: Oct. 29, 1996

[54] METHOD FOR PROVIDING A COMMUNICATION UNIT'S ESTIMATED TIME OF ARRIVAL

[75] Inventors: Gary W. Grube, Palatine; Marc C. Naddell, Schaumburg; Mark L. Shaughnessy, Algonquin, all of Ill.

[73] Assignee: Motorola, Inc., Schaumburg, Ill.

[21] Appl. No.: 209,025

[22] Filed: Mar. 10, 1994

[51] Int. Cl.[6] ............................................. G01S 3/02
[52] U.S. Cl. ........................... 342/457; 364/446; 364/439
[58] Field of Search ................................. 364/446, 439; 342/455, 457

[56] References Cited

U.S. PATENT DOCUMENTS 2,484,463  10/1949  Field et al. ............................. 364/446
3,868,497  2/1975  Vietor ................................. 235/150.27

Primary Examiner—Thomas H. Tarcza
Assistant Examiner—Dao L. Phan
Attorney, Agent, or Firm—Christopher P. Moreno

[57] ABSTRACT

A communication unit's estimated time of arrival at a target site may be determined when the location and velocity of the units has been ascertained. From this information (119), along with terrain information, an estimated time of arrival at a target site may be calculated. Having calculated the estimated time of arrival, this information is then transported to the communication units (102, 103) which is subsequently displayed to their operators.

6 Claims, 2 Drawing Sheets

METHOD FOR PROVIDING A COMMUNICATION UNIT'S ESTIMATED TIME OF ARRIVAL

FIELD OF THE INVENTION

This invention relates generally to communication systems and, in particular, to determining a communication unit's estimated time of arrival.

BACKGROUND OF THE INVENTION

Communication systems are known to include a communication resource controller, a plurality of communication units, and communication resources. In such communication systems, the communication units communicate with each other via the communication resource, where a communication resource may be an RF channel, a pair of RF channels, a TDM slot, or any medium for carrying RF signals. To initiate a communication, a communication unit transmits a communication request to the communication resource controller via a communication resource dedicated for control information (control channel). The communication request includes a request for a particular service, such as allocation of a communication resource and identity of a target communication unit, or units. For example, the request may be for a group call which identifies all the communication units in the same group as the initiating communication unit.

Upon receiving this request, the communication resource controller determines whether the communication unit is authorized to access the system and, if so, grants the request. Having granted the request, the communication resource controller allocates a communication resource to the initiating communication unit and the target communication units, and then transmits a communication resource allocation message on the control channel. All communication units within the coverage area of the control channel antenna receives the allocation message. However, only the communication units identified in the message, i.e., the initiating and target communication units, will access the allocated communication resource and subsequently partake in the communication.

In addition to allowing communication units to communicate, many communication systems provide dispatch service. Dispatch service allows an operator to communicate with one or many communication groups and provides a central point of communication. For example, if the communication system is used by a police force, the operator may be directly coupled to the 911 service provided in that area, and upon receiving a 911 call, can communicate with a police officer in the field who, in turn, can respond to the 911 call. If the 911 call is reporting a fire, the operator may also be in communication with the fire department, which is a separate communication group than the police force. However, this service does not provide the units responding to the call with any information as to when other units will be arriving at the scene. In many emergency situations, the estimated time of arrival of assistance is crucial. For example, if a police officer is responding to an armed robbery his or her response will be different depending on how soon back-up will be on the scene. If back-up is 15 minutes away, the officer may have to individually handle the situation, where, if the back-up is a minute away, the office can wait until the back-up arrives.

Therefore, a need exists for a method that provides estimated time of arrivals of communication units.

DESCRIPTION OF A PREFERRED EMBODIMENT

Generally, the present invention provides a method for determining a communication unit's time of arrival. This is accomplished by first determining a set of target coordinates and then ascertaining the location information of at least two communication units. Having this information, the location and velocity of each of the units is determined and used to estimate time of arrival at the target coordinates. When the estimated time of arrival is determined, this information is provided to the communication units. With such a method, communication units can be informed of their estimated time of arrival at a particular site as well as knowing the estimated time of arrival of other communication units thus allowing the operators of the communication units to anticipate future scenarios or possible situations.

Figure 1:
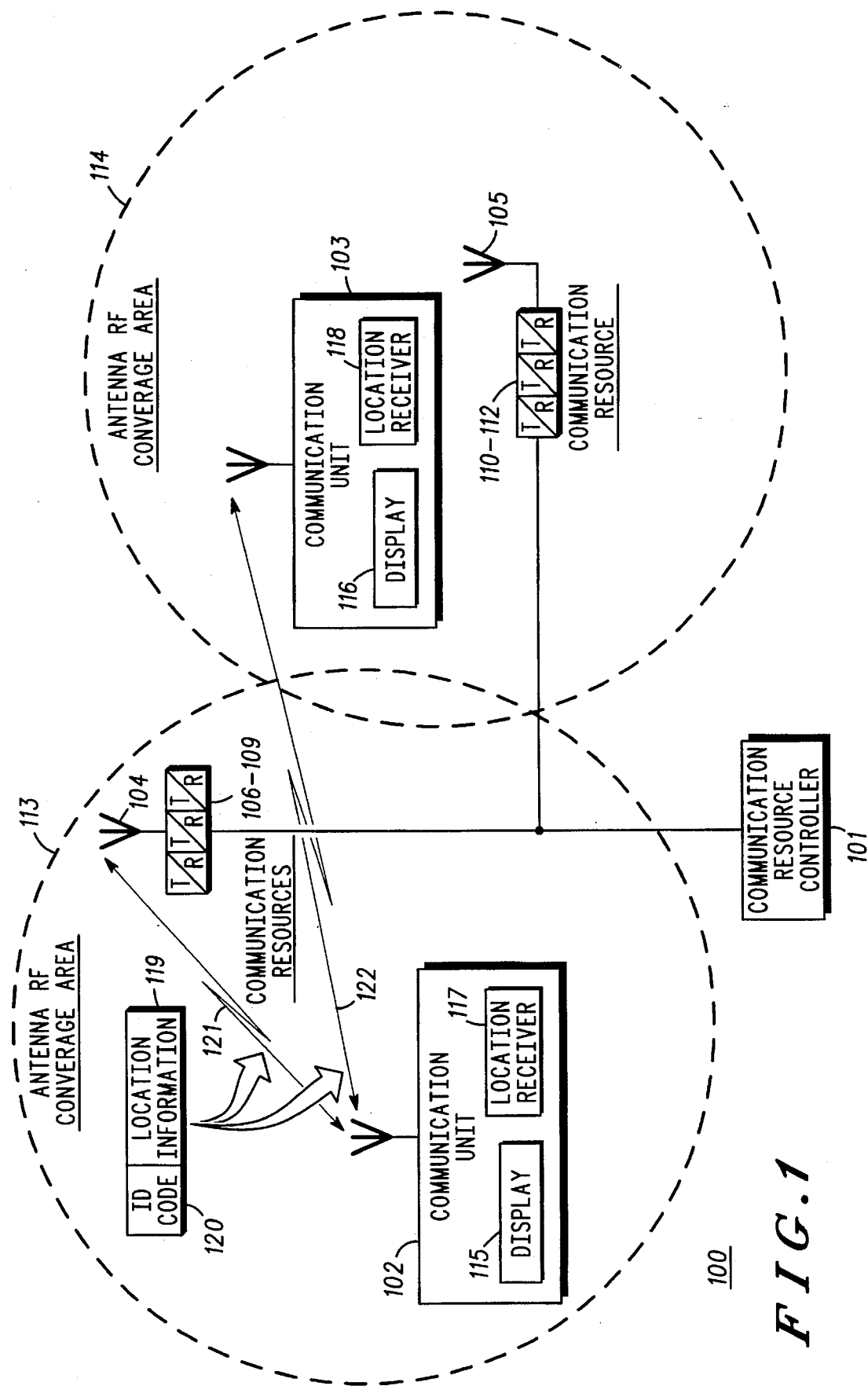
FIG. 1 illustrates a communication system that incorporates the present invention.

The present invention can be more fully described with reference to FIGS. 1 and 2. FIG. 1 illustrates a communication system 100 that includes a communication resource controller (101), a plurality of communication units (102, 103), a plurality of antennas (104, 105), and a limited number of communication resources (106–112). Each of the antennas (104, 105) which may be incorporated into a base station such as Motorola QUANTAR™, has an RF coverage area (113, 114). Each of the communication units (102, 103) includes a display (115, 116) and a location receiver (117, 118). The display (115, 116) may be an LCD display, an CRT display, or a heads-up type display. The location receiver (117, 118) may be a global positioning satellite (GPS) receiver that is coupled to a communication processor (not shown).

Within the communication system 100, a situation typically arises where communication units are instructed to go to a particular site, or target location. In this instance, the communication resource controller (101) transmits a message to the communication units instructing them to head to the target site. Note that the message may be transmitted by a computer aided dispatch station, or, more typically, by a human dispatcher. In response, the communication units (102, 103) transmit a message which includes their identification code (120) and their location information (119). The location information (119) may include their present location as geographic coordinates, directional heading, and velocity. Upon receiving this information, the communication resource controller can subsequently determine an estimated time of arrival to the particular target site.

Figure 2:
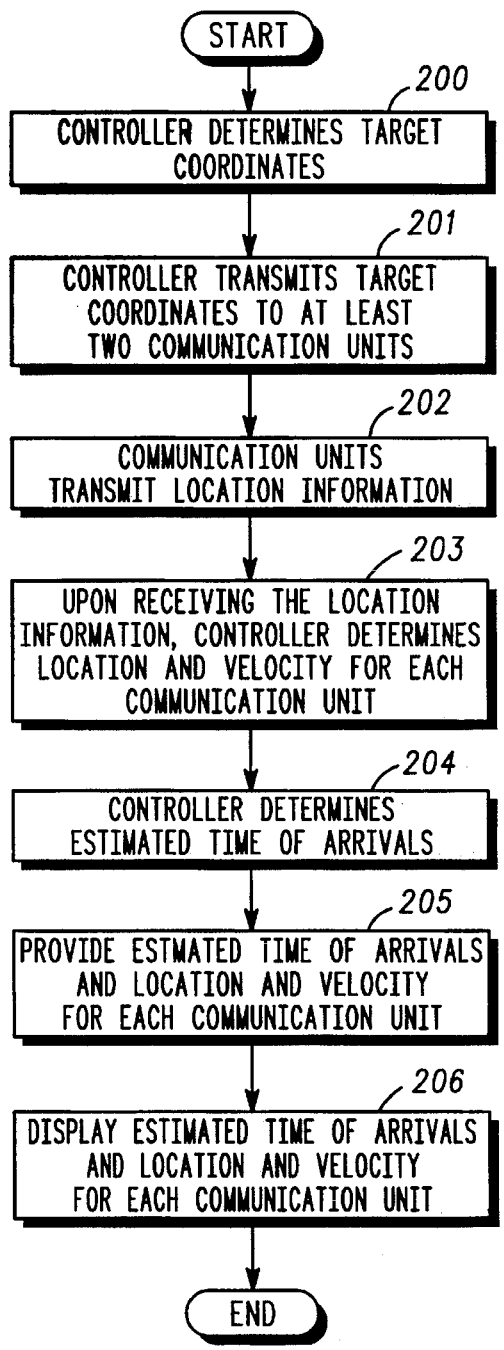
FIG. 2 is a flow chart of a first embodiment in accordance with the present invention.

To further illustrate this, consider the logic diagram of FIG. 2. At step (200), the communication resource controller determines the target coordinates. For example, a dispatch operator may receive a 911 call regarding a burglary in progress, wherein the location of the burglary is the target coordinates. The task assignment, which includes the location of the burglary, is then sent (201) to at least two radios which are to respond to the burglary. Upon receiving this information, the communication units transmit their location information to the communication resource controller (202).

The location information includes the present geographic location, directional heading, and/or velocity, all of which is determined by the location receiver.

Upon receiving the location information, the communication resource controller determines at least the location and velocity of the communication units (203). The determination of the location is relatively straightforward, in that, the communication resource controller reads the geographic coordinates contained in the location information. The determination of the velocity may be done in a variety of ways. For example, velocity may be the present traveling speed of the communication units or it may be based on historical information regarding the time of day, day of week, and terrain information of the area between the location of the units and the target coordinates. Depending on the area of concern, historical information may provide more accuracy than the actual speed of the communication unit. To illustrate, assume that the area of concern is a metropolitan area, it's rush hour, and the communication unit is stationary, historical information can give an approximate speed through the area during rush hour, while the present traveling speed would indicate that the unit would never arrive.

Having the location and velocity, the communication resource controller determines the estimated time of arrival of the communication units at the target coordinates (204). This determination is a straightforward mathematical equation regarding rate, distance and time. In addition to using the location and velocity, the communication unit or resource controller may use terrain information to further enhance the accuracy of the estimated time of arrival. The terrain information provides an indication of the geographic area between the locations of the communication units and the target coordinates. For example if the geographic area in concern is a metropolitan area, the terrain information will provide street information such as two-way highways, four-way highways, one-way streets, etc., such that a reasonable estimate of travel can be ascertained. Having obtained the estimated time of arrivals, this information, along with the units' location and velocity, is provided to the communication unit (205) which is subsequently displayed by the units (206).

Figure 3:
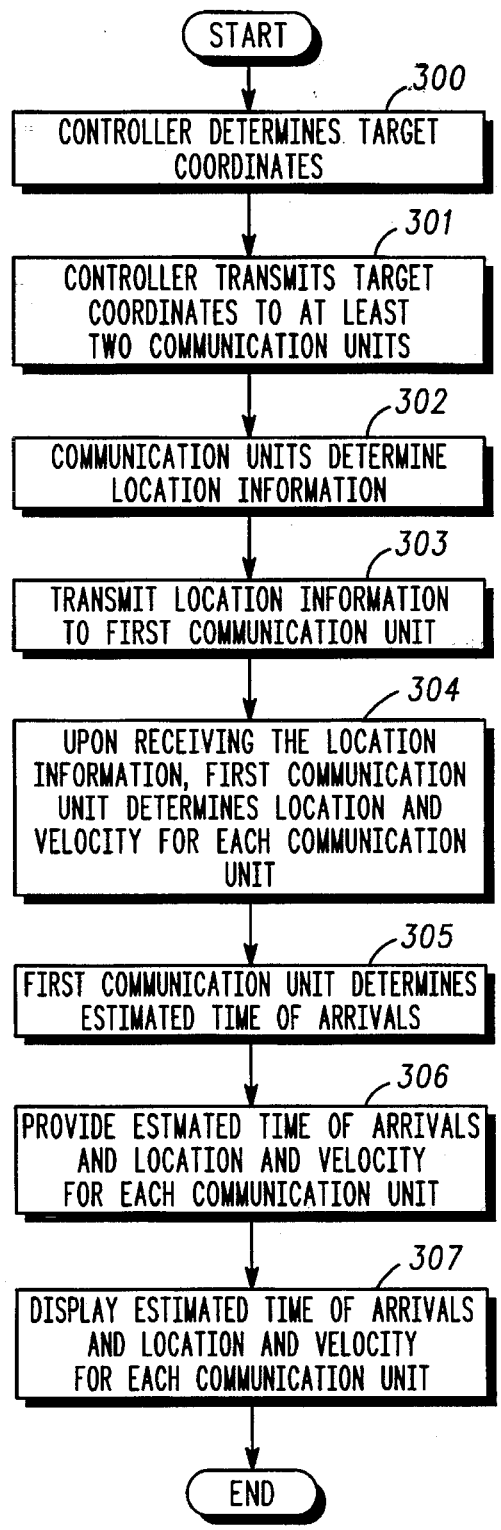
FIG. 3 is a flow chart of a second embodiment in accordance with the present invention.

The above process has been described with the communication resource controller making the estimated time of arrival calculations, however, one of the communication units could also perform the estimated time of arrival calculations. This is illustrated in FIG. 3. Steps (300–301) are essentially equivalent to steps (200–201) from FIG. 2. Additionally, step (302) describes that which is inherent to step (202), namely, the at least two communication units determine location information, as defined above. The at least two communication units then transmit (303) the location information to a first communication unit of the at least two communication units. Upon receiving the location information, the first communication unit determines (304) location and velocity for each of the communication units and determines (305) estimated time of arrivals for each of the communication units, in accordance with the techniques described above at steps (203–204), respectively. The estimated time of arrivals and the location and velocity for each communication unit are provided (306) by the first communication unit such that the at least two communication units can display (307) the information.

The present invention provides a method for estimating communication units' time of arrivals at a target site. With such a method, communication units responding to a particular call can be provided with information as to their arrival as well as the arrival of other communication units. This is particularly useful in the public safety environment where their response to certain emergency conditions is governed, at least in part, by the arrival of back-up. Thus, providing better service to the public and increased safety to the public officials.

We claim:

1. A method for providing estimated time of arrivals of communication units, the method comprising the steps of:
    a) determining, by a communication resource controller, target coordinates;
    b) transmitting, by the communication resource controller, the target coordinates to at least two communication units:
    c) responsive to the target coordinates, transmitting, by each of the at least two communication units, location information;
    d) upon receiving the location information from each of the at least two communication units, determining, by the communication resource controller, location and velocity for each of the at least two communication units;
    e) determining, by the communication resource controller, estimated time of arrivals at the target coordinates for each of the at least two communication units based on the target coordinates and the location and velocity for each of the at least two communication units;
    f) providing, by the communication resource controller, the estimated time of arrivals and the location and velocity for each of the at least two communication units to the at least two communication units; and
    g) displaying, by the at least two communication units, the estimated time of arrivals and the location and velocity for each of the at least two communication units.

2. The method of claim 1, step (e) further comprising the step of determining the estimated time of arrivals based on terrain information of an area between the locations of the at least two communication units and the target coordinates.

3. The method of claim 1, step (d) further comprises determining the velocity for each of the at least two communication units based on historical information regarding time of day, day of week, and terrain information of an area between the locations of the at least two communication units and the target coordinates.

4. A method for providing estimated time of arrivals of communication units, the method comprising the steps of;
    a) determining, by a communication resource controller, target coordinates;
    b) transmitting, by the communication resource controller, the target coordinates to at least two communication units;
    c) responsive to the target coordinates, determining, by each of the at least two communication units, location information;
    d) transmitting, by all but a first communication unit of the at least two communication units, the location information;
    e) upon receiving the location information from each of the at least two communication units, determining, by the first communication unit, location and velocity for each of the at least two communication units;
    f) determining, by the first communication unit, estimated time of arrivals at the target coordinates for each of the at least two communication units based on the target coordinates and the location and velocity for each of the at least two communication units;

g) providing, by the first, communication unit, the estimated time of arrivals and the location and velocity for each of the at least two communication units to the at least two communication units; and h) displaying, by the at least two communication units, the estimated time of arrivals and the location and velocity for each of the at least two communication units.

5. The method of claim 1, step (f) further comprising the step of determining the estimated time of arrivals based on terrain information of an area between the locations of the at least two communication units and the target coordinates.

6. The method of claim 1, step (e) further comprises determining the velocity for each of the at least two communication units based on historical information regarding time of day, day of week, and terrain information of an area between the locations of the at least two communication units and the target coordinates.

* * * * *